United States Patent
Sobel et al.

(10) Patent No.: US 8,161,561 B1
(45) Date of Patent: *Apr. 17, 2012

(54) CONFIDENTIAL DATA PROTECTION THROUGH USAGE SCOPING

(75) Inventors: William E. Sobel, Stevenson Ranch, CA (US); Bruce McCorkendale, Manhattan Beach, CA (US); Richard Willey, Arlington, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,166

(22) Filed: Sep. 17, 2010

Related U.S. Application Data

(63) Continuation of application No. 10/958,477, filed on Oct. 5, 2004, now Pat. No. 7,818,809.

(51) Int. Cl.
*H04L 29/06* (2006.01)

(52) U.S. Cl. ............... 726/26; 726/30; 705/26; 705/51; 709/225

(58) Field of Classification Search .................. 726/26, 726/30; 705/26, 51; 709/225
See application file for complete search history.

(56) References Cited

U.S. PATENT DOCUMENTS

| | | | |
|---|---|---|---|
| 6,442,607 B1 * | 8/2002 | Korn et al. .................. 709/225 |
| 6,829,613 B1 * | 12/2004 | Liddy .......................... 707/694 |
| 7,039,700 B2 * | 5/2006 | Saeidi .......................... 709/224 |
| 7,457,873 B2 * | 11/2008 | Mariani et al. ................ 709/224 |
| 7,523,498 B2 * | 4/2009 | Fellenstein et al. ............. 726/22 |
| 7,617,532 B1 * | 11/2009 | Alexander et al. .............. 726/22 |
| 7,693,750 B2 * | 4/2010 | Christensen .................. 705/14.1 |
| 7,802,298 B1 * | 9/2010 | Hong et al. ..................... 726/22 |
| 7,971,260 B2 * | 6/2011 | Spalink et al. ................. 726/26 |
| 7,996,910 B2 * | 8/2011 | Toomey ......................... 726/26 |
| 2001/0054155 A1 * | 12/2001 | Hagan et al. ................... 713/193 |
| 2002/0038365 A1 * | 3/2002 | Yeh ............................... 709/224 |
| 2002/0069198 A1 * | 6/2002 | Stebbings et al. ................. 707/7 |
| 2002/0194079 A1 * | 12/2002 | Kimble .......................... 705/26 |
| 2003/0037138 A1 * | 2/2003 | Brown et al. ................... 709/225 |
| 2003/0218627 A1 * | 11/2003 | Gusler et al. ................... 345/736 |
| 2004/0128552 A1 * | 7/2004 | Toomey ......................... 713/201 |
| 2005/0257261 A1 * | 11/2005 | Shraim et al. ................... 726/22 |
| 2006/0005247 A1 * | 1/2006 | Zhang et al. .................... 726/26 |
| 2008/0162449 A1 * | 7/2008 | Chao-Yu et al. .................. 707/5 |
| 2008/0307529 A1 * | 12/2008 | Choi et al. ...................... 726/26 |
| 2009/0006532 A1 * | 1/2009 | Sinn et al. ..................... 709/203 |
| 2010/0058446 A1 * | 3/2010 | Thwaites ......................... 726/4 |
| 2010/0138437 A1 * | 6/2010 | Nadig et al. ................... 707/759 |
| 2010/0174602 A1 * | 7/2010 | Zweben et al. ............. 705/14.41 |
| 2010/0174813 A1 * | 7/2010 | Hildreth et al. ............... 709/224 |

* cited by examiner

*Primary Examiner* — Nathan Flynn
*Assistant Examiner* — Sarah Su
(74) *Attorney, Agent, or Firm* — Fenwick & West LLP

(57) ABSTRACT

Methods, apparatuses, and computer-readable media for protecting confidential data on a network. An embodiment of the inventive method comprises the steps of: monitoring 110 data directed to a website; identifying 120 a data string having at least one confidential characteristic; categorizing the data string with a categorization level; examining 140 the website for at least one characteristic consistent with confidential data; creating 155 a website characteristic profile; comparing 170 the website characteristic profile with the data string's categorization level for compatibility; and determining 180 whether the data string can be communicated to the website.

20 Claims, 4 Drawing Sheets

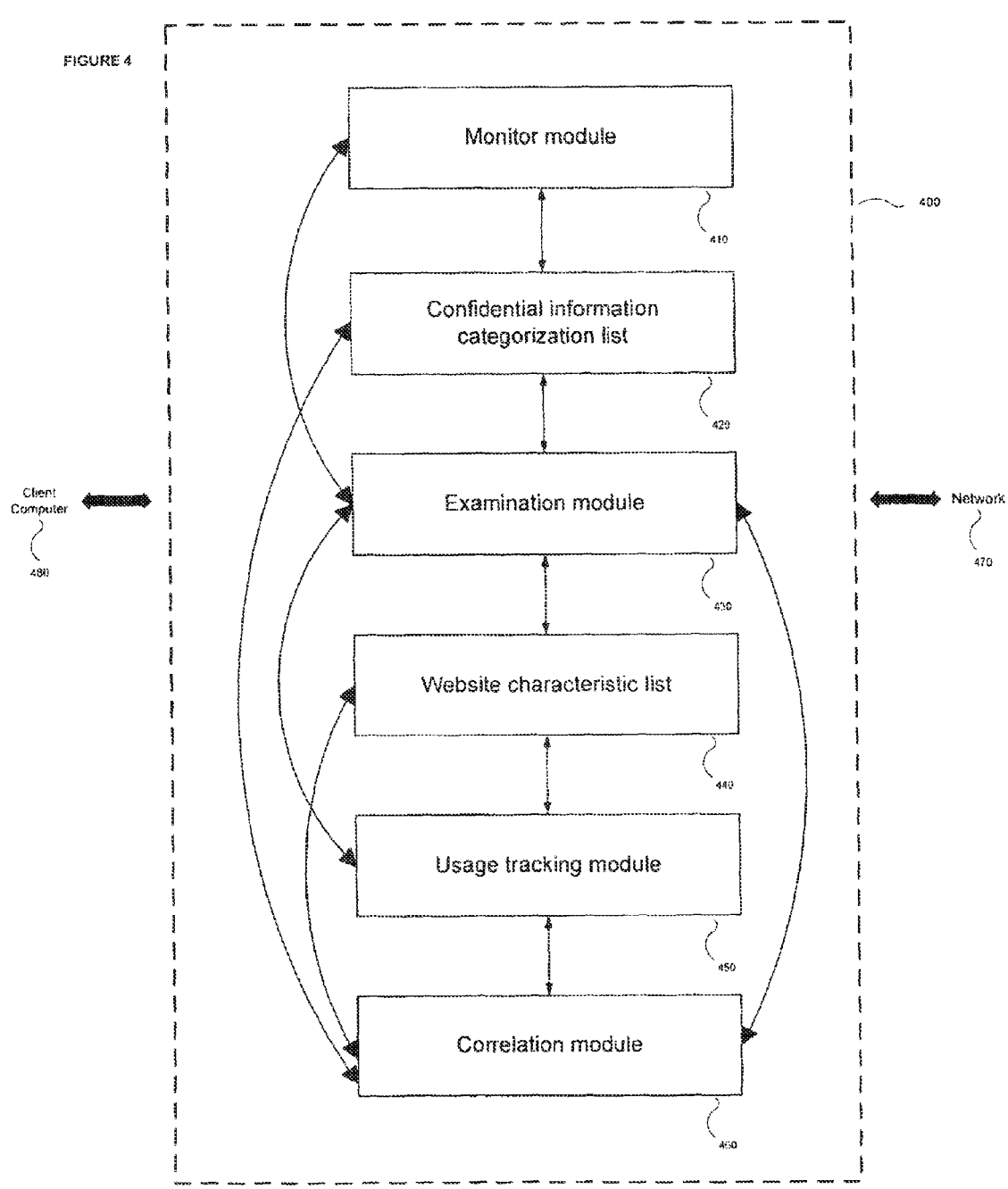

CONFIDENTIAL DATA PROTECTION THROUGH USAGE SCOPING

CROSS-REFERENCE TO RELATED APPLICATIONS

This application is a continuation of U.S. patent application Ser. No. 10/958,477, filed Oct. 5, 2004, which is incorporated by reference herein in its entirety.

TECHNICAL FIELD

The present invention relates to methods, apparatuses, and computer-readable media for protecting confidential information, and more particularly to a method for combating phishing through usage scoping analysis.

BACKGROUND ART

Phishing is a fraudulent email campaign that attempts to elicit confidential and/or financial information from unwitting victims. Also known as carding, phishing generally entails sending large numbers of emails with compelling reasons why the recipient should click on a link to an official-looking yet bogus website. Once there, the user is encouraged to input confidential information such as credit card, Social Security, and bank-account numbers. The email appears authentic, and may convey a message such as "the bank has lost some records and needs to verify some information." To aid the user, the email typically provides a link to a Web based form that gathers the requested information. The form, while official looking and seemingly addressed to an official URL, channels the information to a third party. Before long, the confidential information has been misappropriated.

The cleverness of individuals conducting phishing campaigns is increasing at a dramatic rate. To illustrate just how clever phishing attacks can be, consider the phishing of PayPal®. Despite the deception being right in front of the analysts from the beginning, the solution took several days to realize. Instead of using the letter "I" in PayPal®, the perpetrator used a san serif numeral "1," which looks the same. Phishing is as much an attack of con artists as it is hackers.

Besides the obvious threat to individual privacy that phishing represents, phishing can inflate customer service costs for ISPs and e-commerce businesses. A phishing attack notifying users that their credit card is about to expire and asking for a new input or verification of data can inundate a customer service center with calls.

The response to phishing has achieved limited success. Proposals for limiting phishing include email authentication techniques using antispam standards and scanning for "cousin" domains whereby trademark owners would be notified if a similar sounding URL or site contains spoofed content. Features such as Norton Privacy Control in Symantec's Norton Internet Security product help to stem the increasing number of phishing attacks by allowing users to identify confidential data that they wish to protect. Upon seeing the specific confidential data being transmitted via HTTP (via the web), instant messenger, or SMTP (via email), the user is notified of the pending release of confidential information and prompted to provide verification that the disclosure is authorized. Unfortunately, if a phishing attack is successful, the user believes that they are transmitting their confidential information to a reputable website, thus circumventing the intervention and authorizing the release of sensitive information to what is an illicit destination. Furthermore, current systems lack an ability to modify the level of protection of confidential information based on how the information is used.

There remains a clear need for an effective and automated way to protect confidential information from deceptive and fraudulent phishing campaigns. It would be desirable to recognize the attempted transmission of confidential information to illicit destinations prior to the information's release. It would also be desirable to adjust automatically the scrutiny of confidential information based on the usage of such information. The present invention addresses these and other problems, as well as provides additional benefits.

DISCLOSURE OF INVENTION

Methods, apparatuses, and computer-readable media for protecting confidential data on a network. An embodiment of the inventive method comprises the steps of: monitoring 110 data directed to a website; identifying 120 a data string having at least one confidential characteristic; categorizing the data string with a categorization level; examining 140 the website for at least one characteristic consistent with confidential data; creating 155 a website characteristic profile; comparing 170 the website characteristic profile with the data string's categorization level for compatibility; and determining 180 whether the data string can be communicated to the website.

BRIEF DESCRIPTION OF THE DRAWINGS

These and other more detailed and specific objects and features of the present invention are more fully disclosed in the following specification, reference being to the accompany drawings, in which:

FIG. 4 is a block diagram of one embodiment of an apparatus to protect confidential information through usage scoping.

DETAILED DESCRIPTION OF THE PREFERRED EMBODIMENTS

The present invention identifies confidential information in transit and associates that confidential information with its scope of usage to determine and enforce protection controls. By tracking the scope of usage of confidential information, an association between a categorization of confidential information and the characteristics of the websites to which it is directed can be determined. Based on this association, protection controls or protocols can be implemented to ensure that the confidential information is not inadvertently transmitted to an illicit or deceptive third party while simultaneously allowing its legitimate dissemination.

The present invention offers the following advantages over the prior art:
confirmation of an association between specific confidential information and its intended recipient;
obstruction of illicit attempts to gain confidential information;

enhanced ability to examine encrypted SSL conversations to examine pre-encrypted SSL traffic to ensure recipient validity;

adjusted confidential information protocols based on usage scope;

increased user satisfaction by minimizing or eliminating the loss of confidential information to illicit web sites through fraudulent means.

The use of deceptive and fraudulent emails designed to trick users into providing confidential information is a growing problem that wastes network bandwidth, imposes unjustified burdens on legitimate e-commerce enterprises, and steals private information through illegal means. The present invention allows a user to specify and protect data strings of confidential information such as credit card numbers, bank account numbers, social security numbers, dates of birth, etc. The present invention enables the user to classify or categorize each piece of confidential information in terms of the information string's scope of legitimate use.

Figure 1:
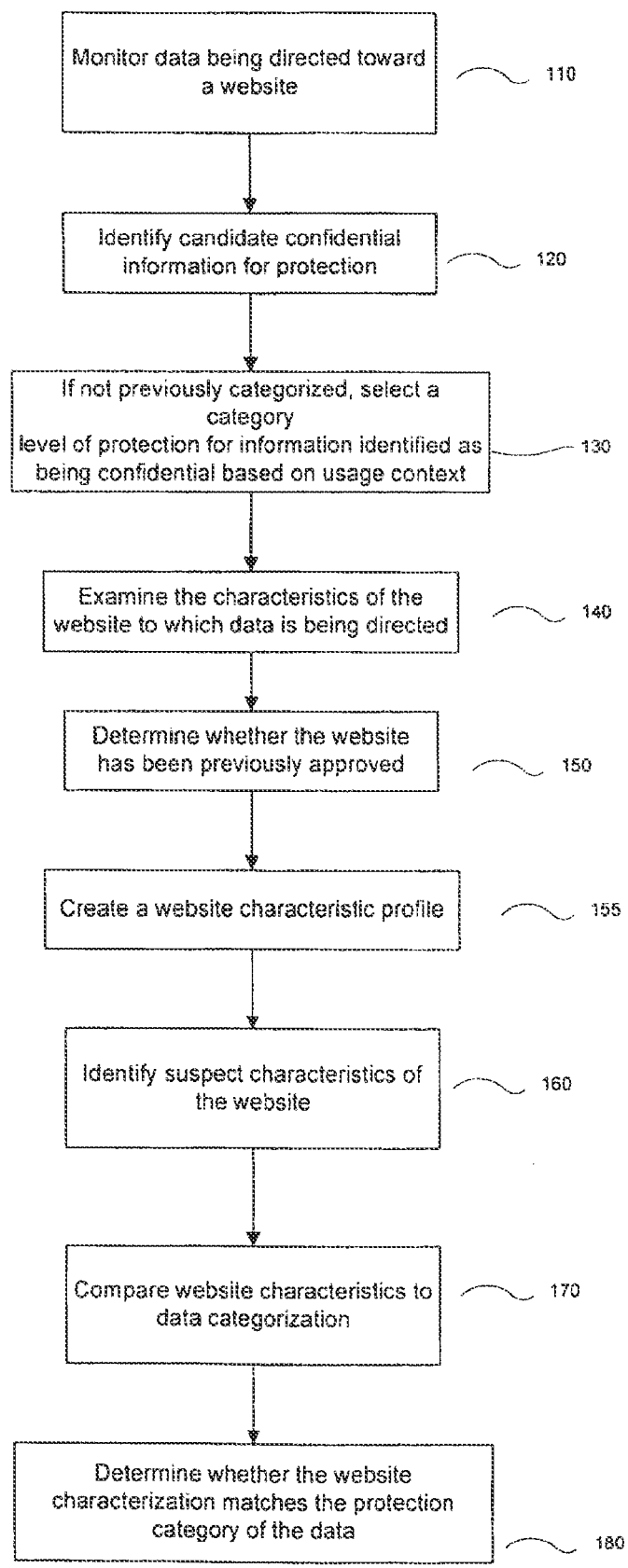
FIG. 1 is a flow diagram of one method embodiment to protect confidential information through usage scoping.

FIG. 1 is a flow diagram of one embodiment of an apparatus 400 for protecting confidential information through usage scoping. In a network environment, the apparatus 400 monitors 110 content of outgoing transmissions to identify strings of data designated by a user as containing confidential information. The strings of confidential data are documented in one embodiment, in an information white-list. The information white-list includes data strings of confidential information designated as confidential by direct user input and by usage scoping. The list serves as a means to categorize the information by degree of confidentiality. The categorization scopes the confidential information with its likely use, as well as the characteristics of websites that would be associated with the information. For example, a bank account number may be categorized as financial information and associated only with financial websites. A pin number for the bank account may be categorized as security information associated with only a specific website. As the apparatus 400 monitors 110 information readied for transmission, it identifies 120 strings of information previously recognized as being confidential. Information deemed confidential, yet absent from the white-list, is added to the white-list and assigned 130 a default category based on the information's usage scope. For example the apparatus 400 may recognize a series of numbers being associated with the word "bank" or "account." While the number is not listed in the white-list, the apparatus 400 identifies 120 the information as being confidential and assigns it a default categorization. In another embodiment, the user may be prompted that confidential information has been recognized. In such situations, the user may be asked to categorize the information. In another embodiment a default categorization may be presented to the user as a starting point. In this example, the default categorization may be "financial account information releasable only to certified financial institutions."

Concurrently, the apparatus 400 examines 140 the website to which the confidential information is being directed, for characteristics consistent with the usage scope of the confidential information. Confidential information, such as a credit card number, may possess a characterization as being financial data yet possess a usage scope broader than that of a bank account number. The scope of usage may include, for example, legitimate commercial enterprises conducting business via the Internet. Such enterprises, as well as banking institutions and other legitimate businesses, are listed in a URL directory or similar resource. Using information gained by the examination 140, the apparatus 400 queries a list of certified websites to ascertain 150 the website's degree of authenticity. This degree of authenticity is used to create 155 a website characteristic profile. For example, it is relatively easy to determine if a website has a valid class-3 SSL, certificate. Information such as this can help characterize websites frequented by the user.

The websites are also probed to identify 160 suspect characteristics. Examination 140 of the website by the apparatus 400 can reveal characteristics, such as geo-location data, network destination classifications, or the transmission security level that may be distinctive of an illicit attempt to steal information. Indeed a wide variety of destination classification/categorization techniques can be used to characterize network destinations such as a website. For example, based on the user's habit patterns and scope of credit card usage over the Internet, it may be uncommon for the user to place an order for a commercial item to a site that is outside of the United States. Furthermore, it may be deemed unusual for a credit card transaction to be directed to a website incapable of sending or receiving encrypted data, or one that is served via a dial-up service. These and other characteristics can aid in determining the authenticity of a website. Having either obtained 120 a previous categorization of the confidential information, or having assigned 130 the information a default category based on its usage scope, the apparatus 400 compares 170 the information string's confidential category with the website certification credentials and characteristics. When the website's certifications and characteristics match the confidential data's categorization, the transmission of the confidential information can proceed without further user input. In situations where the comparison 170 reveals inconsistencies, the user is alerted that confidential information is being directed to a suspect website.

Figure 2:
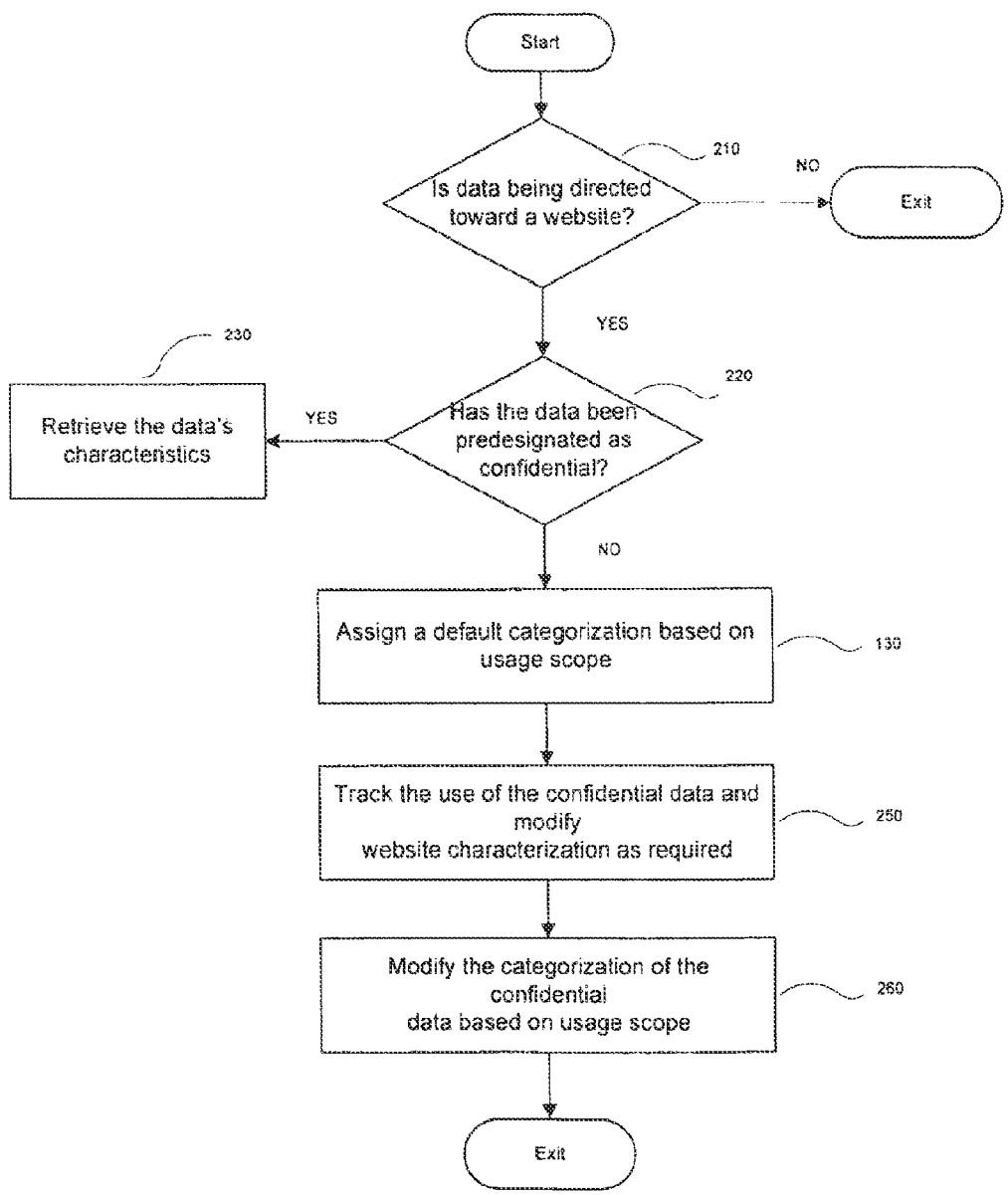
FIG. 2 is a flow diagram of one method embodiment to protect confidential information by categorizing confidential information based on usage scoping.

FIG. 2 depicts a flow diagram of one embodiment for protecting confidential information by categorizing confidential information based on usage scoping. After identifying 120 that confidential information is being directed 210 toward a website, the apparatus 400 examines whether the confidential information has been categorized 220 by the user as being confidential. Information having been previously categorized is retrieved 230 for analysis with respect to the website. When the confidential data is not categorized, the confidential information is assigned 130 a default category. As the apparatus 400 determines 180 whether the confidential information is transmitted to the website, the usage of the confidential information is tracked 250. The apparatus' 400 tracking information develops a usage scope through which the apparatus 400 can modify 260 the categorization of the confidential information. In an alternative embodiment, broader levels of categorization, including the default level of categorization, may be modified to reflect the usage scope.

To illustrate how the categorization of the confidential information may be modified 260 based on usage scope, consider the previous example of a user's credit card number. Assume that the credit card number either was specified by the user as confidential information, or was identified by the apparatus 400 and assigned a default categorization level. As the credit card number is used to carry out legitimate commerce via Internet transactions, the apparatus 400 tracks 250 the websites to which the credit card number is directed as well as the characteristics of these websites. Within a short sampling of transactions, it is possible to categorize the use of credit card information generally, in this example, as commercial transactions conducted with companies possessing certain characteristics. Interactions with certain companies can be periodic and may consistently involve a particular type of merchandise or data structure. For example, one user may consistently use his or her credit card information to purchase airline tickets from domestic airlines and other merchandise from other companies over secure communications, yet never use the credit card over non-secure communications.

The categorization in this example can be narrowly defined to associate only certain domestic companies, and the apparatus 400 can alert the user if a purchase is being transmitted to an unfamiliar website over a non-secured link. In addition to modifying 250 the categorization of the specific credit card number, credit card numbers can be limited to domestic companies in general unless receiving specific authorization from the user. Likewise, an uncommon use of a credit card for transferring funds to a bank account may alert the user that the website being displayed is indeed illegitimate. The degree of confidentiality can also be altered based on the scope of usage. For example, perhaps a certain bank account is associated with only one website. The apparatus 400 modifies the categorization of this particular data string narrowly and is less receptive to any aberration of website characteristics prior to releasing confidential data. As the apparatus 400 tracks 250 the usage of the confidential information, an improved representation of the user's usage scope can be ascertained and thereafter applied to identify and prevent inadvertent disclosure of confidential information.

Figure 3:
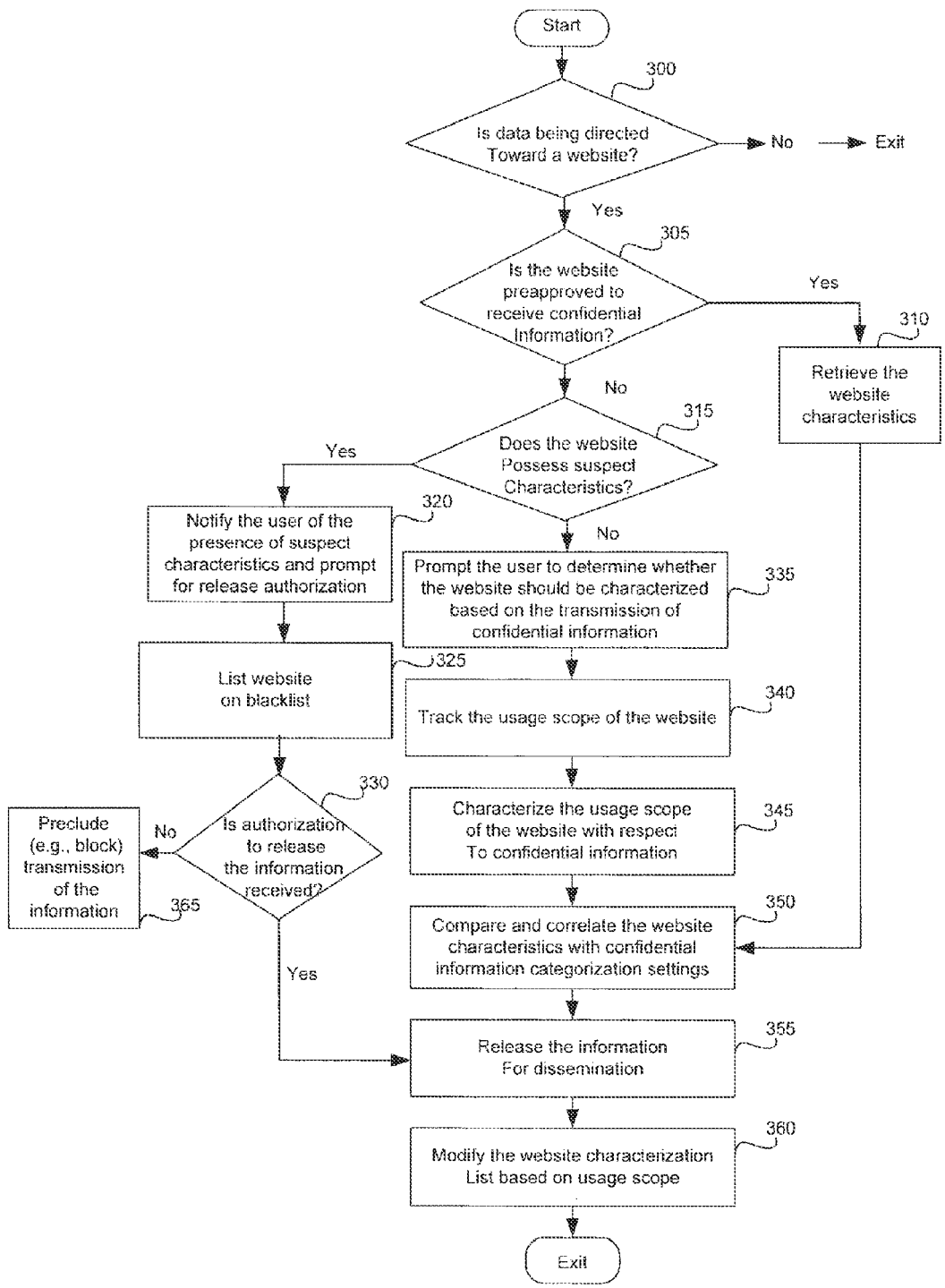
FIG. 3 is a flow diagram of one method embodiment to protect confidential information through characterization of websites.

A flow diagram showing how the characterization of websites can be used to protect confidential information is found in FIG. 3. As the apparatus 400 detects confidential information being directed 300 toward a website, the website is compared 305 against a list of pre-certified sites to ascertain its authenticity. If the site is found to be on the list, its characteristics and authenticity are retrieved 310 and passed to the apparatus for comparison 350 with the confidential information's categorization. While this is ongoing, the apparatus 400 observes and tracks the characteristics of the website. If the website is absent from a list of previously authorized websites, or the list of certified websites, the website is examined 315 for suspect characteristics. If the website is found to possess characteristics that are suspect in relation to the categorization of confidential information, the apparatus 400 alerts 320 the user that confidential information is being directed toward a website possessing suspicious character. In another embodiment, websites that are rejected by the user, or possess numerous suspect characteristics, are listed 325 on a black-list of websites. Once identified, the user may still elect to authorize 330 the dissemination 355 of information or preclude 365 (e.g., block) but only after being amply warned of the suspicious nature of the site. In either event, the apparatus 400 tracks 250 the scope of usage of the confidential information with respect to the website.

Initially, the apparatus 400 relies on specified degrees of categorization by the user and pre-certified lists of authentic websites. These white-lists provide the apparatus 400 with a starting point for analysis of the release of confidential information based on the usage scope of such information. As the apparatus tracks and analyzes the decision to authorize or deny the release of information, the system correlates 350 characteristics of the categorization of the confidential information with the website characteristics. The usage scope of the confidential information is manipulated by the apparatus 400 to modify 360 the examination of future websites and determine 315 whether the confidential information is directed to an illicit website.

To illustrate this process further, return to the user's usage of credit card information and bank account numbers. The bank account information is recognized by the apparatus 400 as containing confidential information and is assigned 130 a default category or categorized by prompting 335 the user. Upon detection that the bank account data string is being directed to a website, the apparatus 400 examines 140 the website for characteristics inconsistent with the default confidential information category and for suspect website characteristics. If necessary, the user is alerted that confidential information is being directed to a website possessing suspect characteristics. At that time, the user may be asked to provide a categorization 335 of the information. When the user is knowledgeable as to the extent to which the confidential information should be released, the user can convey that knowledge to provide an accurate categorization. For example, when the user knows the information should be released to only one website the user can so categorize the data. Similarly, if the user feels the information is releasable to any secure website, that knowledge can be expressed in the categorization of the confidential data. From that point forward, continuing with our example, the usage scope of the bank account information is tracked 340, and the categorization 345 of the confidential information and of the websites it is directed to be updated 360. Over time, the apparatus 400 may recognize that the bank account information is directed to a specific group of websites via a secured link. Once again, deviations from this pattern drive the system to alert the user of a possible unauthorized dissemination of confidential information.

FIG. 4 is one embodiment of an apparatus 400 for protecting confidential information through usage scoping. The apparatus 400 is interposed communicatively between a client computer 480 or similar device capable of disseminating confidential information, and a network 470 such as the Internet, a local area network, wide area network or similar configuration known to one skilled in the art. The apparatus 400 embodies a monitor module communicatively coupled to the confidential information categorization list 420 and an examination module 430. The categorization list 420 is communicatively coupled to the examination module and a correlation module 460. The examination module 430 is further communicatively coupled to the website characterization list 440 and the tracking module 450. The website characterization list 440 is also communicatively coupled to the correlation module 460. The tracking module 450 is also communicatively coupled to the correlation module 460.

As data is directed to a website, the monitor module 410 detects 110 the presence of data strings likely to contain confidential information. The monitor module 410 queries the confidential information categorization list 420 to determine whether the data string is present in a pre-designated list of confidential information. The monitor module 410 further communicates with the examination module 430 regarding the existence of confidential data being directed to a website. The examination module 430 searches a list 440 of certified and/or authorized websites. If the website to which the confidential data is directed is present in the list, the website characteristics, including whether the site has been approved for dissemination, are conveyed back to the examination module.

The examination module 430 communicates with a correlation module 460 to determine 180 whether the website characteristics, based on the existing characterization list 440 and data, match the confidential categorization of the confidential information as retrieved from the white-list 420. While the approval for dissemination of confidential information is ongoing, the characteristics of the website, and its' association with the confidential information, are tracked by the tracking module 450. Data gained by the tracking module 450 is used to modify the confidential categorization list 420 and the website categorization list 440. In one embodiment, the modules of the apparatus 400 coexist on the client computer 480, while in another embodiment the modules and tasks are distributed in a networking environment.

While it is contemplated that the present invention will be used on network computers, it is possible to apply the methodology presented here to network environments with multiple computers in several locations. Although not required, method embodiments of the invention can be implemented via computer-executable instructions, such as routines executed by a general purpose computer, e.g., a server or client computer. The computer-executable instructions can be embodied in hardware, firmware, or software residing on at least one computer-readable media, such as hard discs, floppy discs, optical drives, Compact Discs, Digital Video Discs, etc. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers, and the like. The invention can be embodied in a special purpose computer or data processor that is specifically programmed, configured, or constructed to perform at least one of the computer-executable instructions as explained herein. The invention can also be practiced in distributed computing environments where tasks or modules are performed by remote processing devices, which are linked through a communications network. In a distributed computing environment, program modules may be located in both local and remote memory storage devices.

The above description is included to illustrate the operation of various embodiments of the invention and is not meant to limit the scope of the invention. The elements and steps of the various embodiments described above can be combined to provide further embodiments. The scope of the invention is to be limited only by the following claims. Accordingly, from the above discussion, many variations will be apparent to one skilled in the art that would yet be encompassed by the spirit and scope of the present invention

What is claimed is:

1. A computer-implemented method for protecting confidential data, the method executed by a computer and comprising:
   using the computer to monitor data the computer attempts to communicate to a website;
   identifying within the monitored data a data string;
   categorizing the data string with a description that describes a pattern of previous usage of the data string with other websites;
   locating a website characteristic profile for the website, the web site characteristic profile describing a pattern of previous usage of the website;
   comparing the website characteristic profile with the data string's categorization to determine whether the pattern of previous usage of the data string matches the pattern of previous usage of the website;
   responsive to the comparison indicating that the pattern of previous usage of the data string matches the pattern of previous usage of the website, allowing communication of the data string to the website; and
   responsive to the comparison indicating that the pattern of previous usage of the data string does not match the pattern of previous usage of the website, blocking communication of the data string to the website.

2. The method of claim 1, wherein the using the computer to monitor data comprises tracking user inputs.

3. The method of claim 1, wherein the data string comprises financial information.

4. The method of claim 1, wherein the data string comprises personal information.

5. The method of claim 1, wherein the data string comprises security information.

6. The method of claim 1, wherein the categorizing the data string further comprises categorizing the data string with a categorization of requiring transmission via secure communication.

7. The method of claim 1, wherein the categorizing the data string further comprises categorizing the data string with a categorization of requiring transmission to certified websites.

8. The method of claim 1, wherein the categorizing the data string further comprises retrieving a predetermined data string categorization list.

9. The method of claim 8, wherein the categorizing the data string further comprises adding the data string to the predetermined data string categorization list.

10. The method of claim 1, wherein the categorizing the data string further comprises selecting a default categorization based on usage of the data string.

11. The method of claim 1, wherein the categorizing the data string further comprises categorizing the data string using a user-specified categorization.

12. The method of claim 1, further comprising:
   generating a data string categorization list comprising a plurality of data strings, each data string having an associated categorization describing usage of the data string with other websites; and
   updating the categorization of each data string in the data string categorization list based on the pattern of usage of the data string within the website.

13. The method of claim 1, wherein the website characteristic profile comprises geo-location data associated with the website.

14. The method of claim 1, wherein the website characteristic profile for the website further describes characteristics of intended usage of the website by a user of the computer.

15. The method of claim 1, wherein the monitored data comprises data entered by a user into a form of a web page provided by the website for making financial transactions in the website.

16. At least one non-transitory computer-readable storage medium containing executable computer program instructions for protecting confidential information, the computer program instructions performing the steps of:
   monitoring data a computer attempts to communicate to a website;
   identifying within the monitored data a data string;
   categorizing the data string with a description that describes a pattern of previous usage of the data string with other websites;
   locating a website characteristic profile for the website, the web site characteristic profile describing a pattern of previous usage of the website;
   comparing the website characteristic profile with the data string's categorization to determine whether the pattern of previous usage of the data string matches the pattern of previous usage of the website;
   responsive to the comparison indicating that the pattern of previous usage of the data string matches the pattern of previous usage of the website, allowing communication of the data string to the website; and
   responsive to the comparison indicating that the pattern of previous usage of the data string does not match the pattern of previous usage of the website, blocking communication of the data string to the website.

17. The at least one non-transitory computer-readable storage medium of claim 16, wherein the categorizing the data string further comprises retrieving a predetermined data string categorization list.

18. The at least one non-transitory computer-readable storage medium of claim 17, wherein the categorizing comprises adding the data string to the predetermined data string categorization list.

19. The at least one non-transitory computer-readable storage medium of claim 16, wherein the categorizing the data string further comprises selecting a default categorization based on usage of the data string.

20. The at least one non-transitory computer-readable medium of claim 16, further comprising:
- generating a data string categorization list comprising a plurality of data strings, each data string having an associated categorization describing usage of the data string with other websites; and
- updating the categorization of each data string in the data string categorization list based on the pattern of usage of the data string.

* * * * *